Aug. 4, 1953 J. B. SMITH 2,647,769
PIPE COUPLING
Filed March 13, 1951

INVENTOR.
Joseph B. Smith
BY
Hoodling and Krost
attys.

Patented Aug. 4, 1953

2,647,769

UNITED STATES PATENT OFFICE 2,647,769

PIPE COUPLING

Joseph B. Smith, Cleveland, Ohio

Application March 13, 1951, Serial No. 215,277

1 Claim. (Cl. 285—114)

The invention relates to pipe couplings and more particularly to pipe couplings for joining pipe sections quickly and securely.

This application constitutes an improvement on my pending application Serial Number 121,590 filed October 15, 1949, now Patent No. 2,567,243 for Sleeve Coupling for Pipes.

An object of the invention is the provision of a pipe coupling sleeve having an annular packing member therein compressed sidewise by mechanical means in the same direction that fluid pressure exerts a force thereagainst.

Another object of the invention is the provision of a pipe coupling sleeve having an annular packing member therein with mechanical elements accessible externally of the sleeve for actuating thrust ring means within the sleeve sidewise against the annular packing member in the same direction that fluid pressure exerts a force against said annular packing member.

Another object of the invention is the provision of a pipe coupling sleeve having an internal groove receiving an annular packing member, taken in combination with mechanical elements accessible externally of the sleeve and mechanically engageable with thrust ring means in said groove for pressing the annular packing member sidewise in the same direction that fluid pressure exerts a force against the packing member, the longitudinal reaction of the mechanical elements for pressing the thrust ring means sidewise against the packing member being taken by the mechanical elements engaging a side of the groove.

Another object of the invention is the provision of welding the pipe coupling sleeve to a pipe inserted therein after the sleeve has been mounted upon the pipe.

Other objects and a fuller understanding of the invention may be had by referring to the following description and claim, taken in conjunction with the accompanying drawing, in which:

Figure 1:
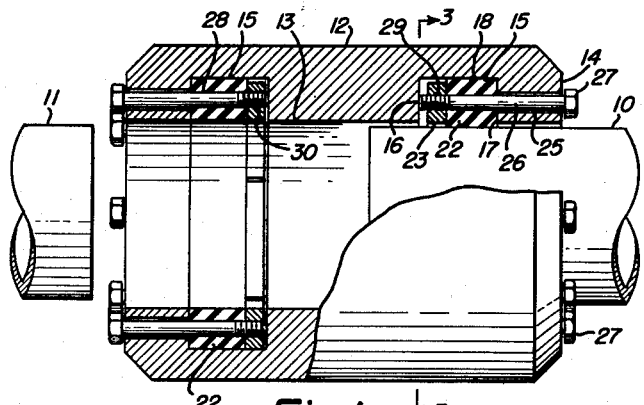
Figure 1 is a longitudinal cross-sectional view of a coupling sleeve embodying the invention, taken along the line 1—1 of Figure 2, the lower right-hand end portion being shown in side elevation to illustrate the external disposition of the sleeve.

The coupling comprises principally a sleeve 12 having a bore 13 adapted to receive pipes 10 and 11, respectively. The two end portions of the pipes 10 and 11 extend into the sleeve 12 and substantially meet intermediate the ends of the sleeve. Inasmuch as the construction of the sleeve at each end is identical, the description will be devoted principally to the right-hand end thereof with regard to the arrangement of the internal parts for making the seal between the sleeve and the pipe which is inserted therein. Extending radially outwardly from the bore 13 of the sleeve 12 and disposed longitudinally inwardly from the external end surface 14, is an internal groove 15 having opposite end walls 16 and 17 interconnected by an annular internal wall 18. Within the internal groove 15 is an annular packing member 22 which may be constructed of any suitable deformable material of a rubber-like nature.

Figure 2:
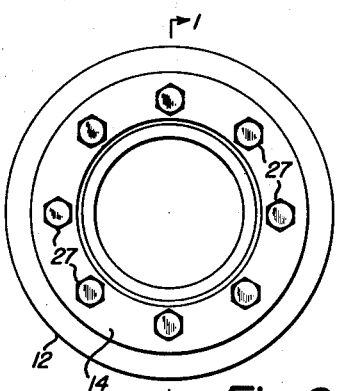
Figure 2 is an end view looking from left-to-right of Figure 1.
Figure 3:
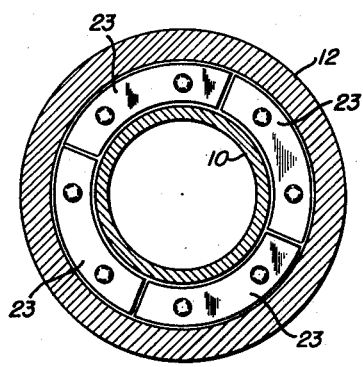
Figure 3 is a cross-sectional view taken along the line 3—3 of Figure 1, and shows principally the end view of the segmental arcuate thrust members.

The end wall 17 of the groove 15 constitutes an abuttable shoulder and the right-hand side of the packing member 22 engages this abuttable shoulder. The left-hand side of the annular packing member 22 constitutes a pressure side. Mounted within the internal groove 15 are a plurality of arcuate segmental thrust members 23 which are insertable through the bore of the sleeve. Any suitable number of arcuate segmental thrust members may be employed and as illustrated in Figure 3 of the drawings, there are four such segmental thrust members which when assembled, constitute thrust ring means. The right-hand side of the thrust ring means constitutes a mechanical pressure face for pressing against the pressure side of the annular packing member 22. The packing member 22 and the thrust ring means have external surfaces fitting within the annular external wall 18 of the groove and have external surfaces defining an annular opening to receive with clearance the end portion of a pipe inserted in the coupling. This is illustrated in Figure 1 in the left-hand side thereof which shows that the packing member and the thrust ring means are slightly larger in diameter than the pipe 11 so that the pipe 11 may be easily inserted therein. The sleeve between the end surface 14 thereof and the abuttable shoulder 17 of the groove is provided with a plurality of annularly spaced longitudinal openings 25 to receive mechanical elements such as machine bolts 26 having head 27 externally disposed for actuation by suitable wrench or tool. The packing member 22 is provided with a plurality of apertures 28 which are registrable in longitudinal alignment with the longitudinal openings 25 so that the mechanical elements 26 may extend therethrough. The inner ends of the mechanical elements are provided with threads 29 which threadably engage threaded openings 30 in the arcuate segmental thrust members 23. The inner ends of the mechanical elements or machine bolts engage the end wall 16 of the groove. The rotation of the mechanical elements or machine bolts 26 threadably forces the thrust ring means toward the packing member, with the result that the mechanical pressure face of the thrust ring means presses the pressure side of the annular packing member sidewise and thereby squeezes the annular packing member radially inwardly against the pipe inserted therein. The thrust ring means presses the packing member sideways in the same direction that fluid pressure exerts a force upon the packing member. The assembled position of the packing member 22 is shown in the right-hand end of Figure 1 and in both ends of Figure 4. Upon rotation of the mechanical elements 26 or machine bolts, the inner end thereof contacts the end wall 16 of the groove, whereby the end wall operates as a reaction surface for establishing the mechanical pressure for pressing the thrust ring means against the packing member 22. A clearance exists between the heads 27 of the mechanical elements and the end surface 14 of the sleeve, so that positive assurance is always guaranteed that the inner end of the mechanical elements engages the end wall of the groove for establishing the reaction force for pushing the thrust ring means against the sides of the packing member. As shown in Figure 2, the mechanical elements 26 are spaced annularly about the ends of the sleeve, being eight in number, but it is to be understood that any other number may be employed for this purpose depending upon the diameter and size of the coupling sleeve.

In assembling the parts within the internal groove 15, the segmental arcuate thrust members 23 are first mounted within the groove. In mounting the segmental thrust members within the groove, the procedure is to mount three of the segmental members and then the fourth member is slid in sidewise completing the split thrust ring. This side way insertion of the last segmental member is made possible since the packing member 22 has not as yet been mounted and sufficient space is provided to insert the last of the segmental arcuate thrust members in sidewise to make the complete split ring. When once the segmental thrust members are mounted, they will remain in place since they cannot fall out because the abutting ends of the split rings support themselves within the internal groove. After the segmental rings are mounted, the packing member 22 is then mounted in the groove. The packing member may be of any suitable rubber-like material and thus it may be inserted in the groove by deforming same and positioning it in place. After the packing member 22 is mounted in the groove, the mechanical elements or machine bolts 26 are inserted in the longitudinal openings 25, through the apertures 28 of the packing member and then threadably into threaded openings 30 of the segmental thrust members. The machine bolts are then screwed into the threaded openings of the segmental thrust members until the ends thereof engage the side wall 16 of the groove. The sleeve now is ready to be mounted upon the ends of the pipe to be connected. After the sleeve is mounted upon the ends of the pipes to be connected, it is only necessary for the operator to turn or rotate the machine bolts 26 until the packing member 22 is squeezed tight against the pipes inserted therein. Upon firmly tightening the machine bolts 26, the sleeve provides a good fluid seal with the pipes and the fluid system is then ready for operation. The applications of fluid pressure against the packing members exert a force in the same direction that the mechanical thrust means exerts against the packing members.

One particular use for this coupling is for joining pipe-line sections quickly and securely whereby the amount of time that the line is out of service is reduced to a minimum. The pipe line may be restored to service just as soon as the sleeve is mounted around the pipe sections and the machine bolts 26 tightened down. Thus, the coupling may be readily connected to a pipeline section by hand tools to restore service quickly and safely.

Figure 4:
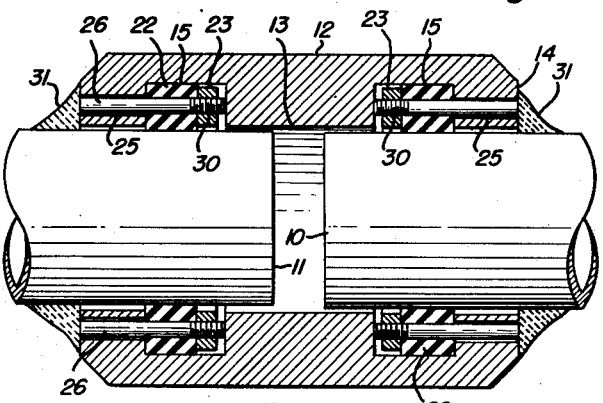
Figure 4 is a longitudinal cross-sectional view of the coupling sleeve completely assembled on the pipes, the ends being welded to the pipes inserted therein.

The final seal of the sleeve to the pipes is effected by welding as shown in Figure 4, and this may be done at any time after the seal is effected by tightening the machine bolts 26, which condition may continue for several days or even months before the welding operator reaches the job to make the permanent welded connection. In this way it is not necessary for the welder to go immediately to the job and weld the sleeve to the pipes but may schedule his welding operations in a safe and efficient manner to produce the largest amount of effective work over a given length of time. In welding the sleeve to the pipes, the operation comprises stringing or depositing a fillet weld 31 around the ends of the couplings and secure same to the pipe. This effects a definite seal between the bore 13 of the sleeve and the pipe.

As illustrated in Figure 4, the heads of the machine bolts 26 may be burned off by the welding equipment after which the weld material 31 may be built up around the pipes and adjacent the ends of the sleeve. A sufficient amount of weld material may be deposited to make a good mechanical seal.

Figure 6:
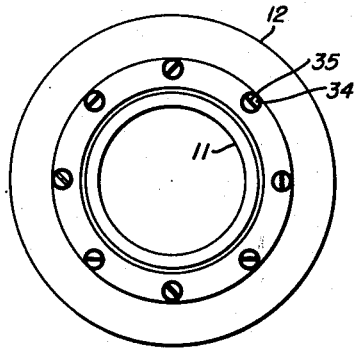
Figure 6 is an end view of Figure 5 looking from left-to-right and shows the coupling sleeve prior to welding.
Figure 5:
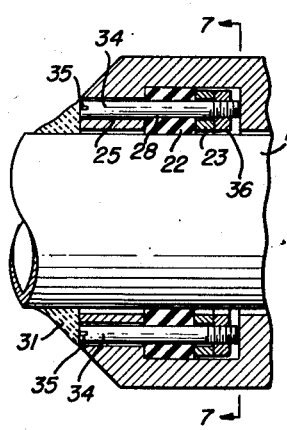
Figure 5 is a fragmentary view of a modified end of the coupling sleeve and shows principally a modified arrangement of the mechanical elements which mechanically engage the thrust ring means for squeezing the annular packing member against the pipe inserted therein.
Figure 7:
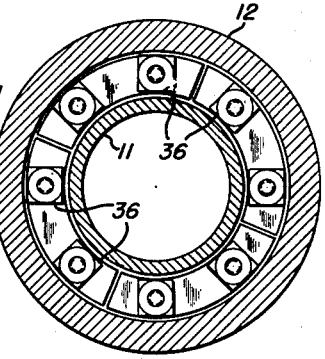
Figure 7 is a cross-sectional view taken along the line 7—7 of Figure 5.

In Figures 5, 6 and 7, I show a modified form of the invention in that the machine bolts 26 are replaced by studs 34 having their outer end portion provided with a slot 35 to receive a wrench or tool for rotating the same. Instead of the segmental thrust members being threaded, the inner end portions of the studs 34 threadably screw into nuts 36 so that upon rotation of the studs 34, the nuts press against the segmental thrust members and force the latter against the packing member for squeezing same against the pipe inserted therein. The nuts 36 are preferably square in outline so that as the studs 34 are turned thereinto, the nuts engage the internal wall 18 of the groove to prevent rotation thereof. The operation of the sleeve as shown in Figures 5, 6 and 7 is substantially the same as that described in the previous views and after the sleeve is completely mounted upon the pipes, the ends of the sleeve may be welded to the pipes in the same fashion as that shown in Figure 4.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A pipe coupling comprising a one-piece annular sleeve having a longitudinal bore to receive the end portion of a pipe, said sleeve having an external annular end surface and an internal groove extending radially outwardly from the bore and located at a spaced distance from the said external end surface, said groove having first and second opposing end walls and an annular internal wall extending therebetween, said first end wall of the groove constituting an abuttable shoulder and being spaced at a closer distance from said external end surface than said second end wall, an annular packing member having first and second sides disposed in said groove, said first side of the packing member engaging said abuttable shoulder and said second side constituting a mechanical pressure side, thrust ring means insertable through said bore of the sleeve and having first and second sides disposed in said groove, said first side of the ring means constituting a mechanical pressure face for pressing the mechanical pressure side of the annular packing member, said packing member and said ring means having external surfaces fitting within the annular internal wall of the groove and having internal surfaces defining an annular opening to receive the end portion of a pipe inserted in the coupling, said sleeve having longitudinal openings extending longitudinally from said external end surface and to the first side of the groove, said annular packing member having apertures extending therethrough and being registrable in alignment with the longitudinal openings of the sleeve, mechanical elements in said longitudinal openings and having an outer end portion accessible externally of the sleeve and having an inner end portion extending through the apertures in said packing member and mechanically engageable with said thrust ring means, said inner end portion of said mechanical elements contacting said second side of said groove and pressing the mechanical pressure face of said thrust ring means against the mechanical pressure side of the annular packing member for squeezing said annular packing member radially inwardly against the end portion of a pipe inserted therein, and weld material mechanically connecting and sealing said external annular end surfaces of said sleeve to pipes inserted therein, said weld material covering the outer end portion of the mechanical elements and sealing said longitudinal openings in said external annular end surfaces of said sleeve.

JOSEPH B. SMITH.

References Cited in the file of this patent

UNITED STATES PATENTS

| Number | Name | Date |
|--------|------|------|
| 2,197,450 | Curtis | Apr. 16, 1940 |
| 2,289,271 | Kane | July 7, 1942 |